Patented Jan. 6, 1931

1,787,618

UNITED STATES PATENT OFFICE

CARLETON ELLIS, OF MONTCLAIR, NEW JERSEY

RESIN OR RESINOUS PRODUCT AND PROCESS OF MAKING SAME

No Drawing. Application filed July 2, 1921, Serial No. 482,172. Renewed March 1, 1930.

This invention relates to a molding composition and to the process of making same and to molded products made from such composition and relates especially to phenoloid sulphur chlorid resins prepared by reacting on a phenol or a phenolic body with sulphur chloride or a reagent containing the latter.

When sulphur chloride is allowed to react on carbolic acid or phenol and provided a sufficient quantity of the sulphur chloride is present, the phenol is entirely transformed into a resinous body. With inadequate amounts of sulphur chloride certain water-soluble crystalline substances are produced together with resin. By employing proportions such that one equivalent of phenol is treated with at least one equivalent of sulphur chloride ($S_2Cl_2$) water-soluble compounds are substantially avoided. In making a molding composition which frequently has to withstand water or moisture, this consideration is of importance. Accordingly in preparing resins from carbolic acid, an amount of sulphur monochloride preferably is used represented by one and one-half to three and one-half times the weight of the carbolic acid. In the case of cresol an amount represented by one and one-half to two and one-half times the weight of the cresol preferably is used. In this specification, the term "meta-para cresol" will be used in its ordinary commercial usage, i. e., to indicate a mixture of meta cresol and para cresol, irrespective of the proportions in which the two bodies are present. In the following specification the resin will be identified by the amount of sulphur chloride employed in making it. For example 150% phenol sulphur chloride resin means that 150% of sulphur chloride (based on the amount of phenol) are used in making the resin. Similarly 200% cresol sulphur chloride resin indicates that two parts by weight of sulphur chloride are used to one part of cresol.

The resin may be made by slowly adding the sulphur chloride to the phenolic body, e. g. phenol or cresol. Heating occurs and the temperature may be allowed to rise without any external cooling but preferably not to a point where objectionable darkening occurs. A higher degree of resinification is usually secured and apparently a more complex resin is formed by using high percentages of sulphur chloride and working at a temperature elevated considerably above room temperature as for example 50–100° C.

On the other hand the phenol or cresol may be diluted with a solvent such as benzol or toluol and the sulphur chloride added to this solution. At the close of the operation there is obtained either a solution of the resin or a magma in which some of the resin is in solution and some out of solution. It is advantageous to use a solvent from the standpoint of producing a light colored product and also to enable residual hydrochloric acid, liberated by the reaction, to be removed through suitable washing operations. For instance the solution of the resin in benzol as prepared and containing some hydrochloric acid may be agitated with a solution of carbonate of soda to wash out the free acid. A solution prepared in this manner may be used directly to impregnate a filler ordinarily employed in making molded products.

In the present invention it is an object to produce a cheap molding composition which will replace shellac and similar more costly compositions now employed. A great many articles such as cutlery handles, pistol grips, telephone receiver mouthpieces and the like are now made from mixtures of shellac and filler. Shellac softens very readily when warmed as for example by the heat from an ordinary domestic steam radiator, hence articles having a shellac binder, such as phonograph records left near radiators may warp out of shape. Shellac is somewhat expensive and certain grades are difficult to obtain.

The product prepared from phenols and sulphur chloride, especially when the hydrochloric acid is recovered, constitutes a relatively cheap source of resin which enables the replacement by synthetic means of the vanishing supply of natural resins. Molded articles may be made from these sulphur resins which do not soften as readily as shellac molded articles but will stand a considerably higher temperature without losing shape. Furthermore, the molded product which may be prepared with the phenoloid sulphur chlorid resins shows a good surface finish and a satisfactory covering power as regards the filler so that the latter is not ordinarily visible on the surface of the molded article. A satisfactory percentage of sulphur chloride for use with carbolic acid is 250%. This gives an easily-molding resinous composition. In the case of cresol, 150–200% of sulphur chloride serves satisfactorily for many purposes and sufficiently hard yet fusible resins may be produced. Cresol or similar sulphur chlorid resins should be flowable enough to lend themselves to molding readily but should be sufficiently hard and resistant to heat to withstand ordinary service conditions. The higher the percentage of sulphur chloride used on cresol, the higher, generally speaking is the melting point or resistance to softening by heat, up to a certain point beyond which the cresol will take up no further sulphur chloride.

The sulphur in these sulphur chlorid resins exists almost entirely in a very stable form combined intimately in the organic structure in such a way that the properties of free sulphur are entirely lacking. It was supposed that sulphur chlorid resin of this character would blacken steel molds owing to the formation of iron sulphide, but repeated tests with different grades of the resin under different temperatures and pressures have brought forth the surprising fact that the resin does not have the expected blackening action on the molds, these remaining bright and clean even after repeated use.

The filler which is used in the preferred form of the invention is wood flour and preferably approximately equal parts of wood flour and the resin are used. Of course the proportions may be varied widely from equal parts ranging from a very small amount of wood flour or other filler with a large percentage of the resin, to a large percentage of filler and a small percentage of resin. The wood flour employed preferably should not contain more than 6% of natural resin. It should be as free as possible from moisture and preferably be low in bulk. It should contain no metallic or abrasive matter to scratch the molds or discolor the surface of the molded article. The wood flour should preferably be of such a fineness that 80% will pass an 80 mesh screen.

In making molded compositions it is important for many purposes to have a light colored resin binder so that the natural color of the molded product is light and will take additions of coloring material to form an article having a rich, brilliant colored surface. The resin made from clean crystallized carbolic acid using for example 250% sulphur chloride, if properly made is light yellow in color and when molded with wood flour will yield a yellow or straw colored product. Other colors such as dyes, lakes and mineral colors may be added to change this natural color to red, green, brown, blue or other shade desired. Lamp black may be introduced to afford a black product. The addition of other resinous substances is not prohibited as for example shellac or other resins but ordinarily I prefer to use a sulphur chloride resin as the sole binding agent without additions of other resins or vegetable oils or of sulphured oils and substances which would cause blackening or objectionable discoloration of the resin itself or of the molds. Preferably also I use a form of the sulphur chlorid resin which has been made with a sufficient amount of sulphur chloride to convert all the original carbolic acid, cresol or higher phenol from its natural condition into a resinous body in which there is no longer present any of the original phenol in its natural state. Such a "completely converted phenolic sulphur chlorid resin," as I choose to call it, is most desirable as a binding agent and preferably or in many cases is used as the sole binding component.

In addition to wood flour filler mentioned above, other fibrous fillers such as cotton, wool, asbestos, and the like may be used, also mineral powders such as talc, whiting, barytes, clay, silica, and the like may be used as additions in some cases. For example in making phonograph records a mineral filler is especially desired. Basic fillers such as zinc oxide are useful as in some cases tending to increase the melting point and with a white pigment such as zinc oxide affording a white or cream-colored molded object.

The filler may be incorporated with the resin binder in several ways. For example it may be ground with the resin in a ball mill, so as to uniformly dust or coat the fibres with the resin, or a better way is to impregnate a fibrous filler by means of a solution of the resin. For example a solution of the resin alcohol, benzol, or better a mixture of alcohol and benzol, may be employed to impregnate the filler, the mixture dried out and ground for a brief period to remove lumps. In this way a product is obtained which shows high covering power, that is, in the molded product the surface will be found smooth and homogeneous without the filler showing through. The treatment of wood flour by solutions of the resin to make an impregnated product form one feature of the present invention.

Another manner of mixing the resin and filler is to pass over heated rolls working the material together in this manner.

The sulphur chloride resins employed herein vary considerably in their solubility in organic solvents depending on the content of combined sulphur. Low percentages of combined sulphur give products quite readily soluble in alcohol, as for example 100% to 150% sulphur chloride phenol or cresol resin are generally fairly soluble in alcohol. With a higher percent of combined sulphur the solubility in simple solvents decreases and mixed solvents are better adapted to produce solutions. A composite solvent consisting of an aromatic hydrocarbon such as benzol with an alcoholic body such as denatured alcohol is a useful solvent for 250% phenol resin. Similarly a mixture of toluol and acetone serve to dissolve 180% cresol resin.

The proportion of sulphur chloride used in making sulphur chloride resins is preferably such that the resin contains approximately between 20 and 60% of combined sulphur. The phenol resin may contain combined sulphur chloride ranging between 40 and 60%, at least 40% being present to advantage. Preferably (when the resin is to be used in solution) no free sulphur is present, or in any event only in very small amounts owing to the possibility of blackening molds and also because the sulphur has an objectionable effect on the molded product in some cases. It is therefore absent or substantially so in the preferred form of the invention, but in special modifications involving the production of very cheap molded articles it may be present. In certain cases the range of sulphur in combination may reside between the limits 50 and 60%. Thus a major portion of the components of the resin is combined sulphur.

*Example 1.*—Phenol sulphur chloride resin was made by treating carbolic acid crystals with 250% sulphur chloride. The latter was added gradually and the solid resin which formed was allowed to cool after the reaction had subsided. The resin was broken up into small fragments and 100 parts by weight were mixed with a like weight of wood flour, 3 parts of paraform and 1½ parts of stearic acid. The mixture was ground in a ball mill for one hour. In this way the fibres of the wood flour were well coated with the pulverized resin.

This molding powder was tested for molding properties by molding in a steel mold at 3800 pounds per square inch on the mold for three to five minutes at a temperature of 270° F. The resin was found to flow well in the mold and to cover the fibres adequately. The color of the molded product was light, being a pale yellow. The resin in the product was fusible but had a substantially higher softening point than shellac. Incorporating resin and filler by ball mill grinding does not give as uniform a distribution of the binder as the impregnation method described later.

*Example 2.*—Meta para cresol was treated with 150% by weight of sulphur chloride and the resin obtained from this operation was used to make an impregnated molding mixture. The sulphur chloride in this case was not the commercial article containing three to five per cent of free sulphur but was a product obtained by treating the commercial article with chlorine gas until about 5% by weight of chlorine was taken up. This yielded a monochloride of sulphur free from free sulphur. 100 parts of the resin and three parts by weight of stearic acid were dissolved in 200 parts by weight of denatured alcohol. The resin dissolved to a satisfactory clear solution without any turbidity caused by free sulphur. Six parts by weight of hexamethylene tetramine were dissolved in 100 parts by weight of denatured alcohol. The latter solution was mixed with 100 parts of wood flour and dried. The dried material was then admixed with the resin solution making a paste or mash which was dried at 212° F. The product was somewhat lumpy and was passed through a grinder.

Molding was carried out at a temperature of 350° F. with a pressure of 3800 pounds on the mold. The time of treatment was three minutes. This mix does not flow well below 350° F. It has a darker color than the paraform product (Example 1). The hardness is satisfactory, being no more readily scratched by a phonograph needle than the ordinary shellac phonograph record made with hard mineral fillers instead of the wood flour used in the present example.

*Plasticity.*—In order to mold a product of this character the degree of plasticity should be considered. This may be regulated to a considerable extent by the time of exposure to heat while drying off the alcohol or other impregnating solvent. In the foregoiong case exposure to 212° F. for a period of about three hours was employed. Ordinarily an exposure of between one and three hours to a temperature between 200 and 250° F. is recommended for the particular conditions represented by the foregoing example. The resin by itself when exposed to heat in a baking oven has self hardening properties. The effect of formaldehyde, paraform or similar aldehyde material, hexamethylene tetramine and the like is to somewhat increase the hardness and give an increase in melting point. (It does not render the product infusible, as is known to happen with several other synthetic resins.) Only a small amount of the aldehyde material is required, 3% ordinarily being adequate and usually increasing the softening point about 50° F. although this increase depends to a very considerable extent on the nature of the resin in hand, etc. Ordinarily the resin is treated with at least an equivalent amount of sulphur chloride and generally with a very considerable excess of sulphur chloride over that represented by simple equivalent or combining weights. Thus the presence of free phenol or cresol is avoided and the resin improved in quality. Increasing the percentage of aldehyde material beyond 3% or thereabouts is not necessary or generally speaking, useful. Formaldehyde is relatively an expensive reagent, and the use of large quantities increases the cost of manufacture of the sulphur resin without ordinarily affording any markedly beneficial effect. For example, a resin made from carbolic acid with 250% of sulphur chloride (which resin will contain somewhat over 40% of combined sulphur), admixed with a wood flour filler and molded into shape will have a softening point represented by that temperature at which the sample will bend or flex rather readily. This may be at approximately 150° or 160° F. With 3% of aldehyde material (hexamethylene tetramine) the softening or flexing point is approximately 210° F. Further additions of aldehyde material do not greatly raise the temperature at which softening occurs, a fusible resin being formed irrespective of the amount of formaldehyde material used. With cresol sulphur chlorid resin made from meta para cresol and 150% of sulphur chloride a softening point of about 180° F. is observed when a molded disc as made by Example 2, is heated in oil or paraffin. With 3% of hexamethylene tetramine the softening point is about 250° F.

The phenol resin made from white crystallized carbolic acid, generally speaking, is lighter than the cresol resin. Sulphur chloride reacts with aniline and various other amino compounds to produce strongly colored (say blue or purple) materials. The presence of aniline, etc. in the phenol or cresol is objectionable if the reaction is carried out in such a manner as to produce these colored materials, if a light colored resin is desired. Iron also under some conditions will cause a darkening of the resin as for example when an alcohol solution of the sulphur resin comes in contact with an iron surface. The darkening does not however take place in a hydrocarbon vehicle such as benzol. The discoloration due to iron may be avoided in some cases by addition of oxalic or tartaric acid.

Hexamethylene tetramine has a slight darkening action on the resin which is sometimes objectionable. As stated color is an important consideration in making some molded products. Using delicate shades of dyes it is necessary to have very light colored material. A tinted article requiring dielectric strength is best made by the use of dye stuffs rather than mineral fillers. To fix the dye in the resin when the former is of a water-soluble character tannic acid or other mordant may be used.

*Example 3.*—250% phenol resin 100 parts by weight, hexamethylene tetramine 3 parts by weight and stearic acid serving as a mold lubricant 3 parts by weight, were ground together in a ball mill and 100 parts of asbestos fibre were added. The materials were ground for one hour. A molding temperature of 300° F. with a pressure of 4000 pounds was used. The time of molding was three minutes. The sample was allowed to cool in the mold.

*Example 4.*—25 parts by weight of phenol was admixed with an equal weight of benzol and 50 parts of long fibred asbestos added. Sulphur monochloride 60 parts by weight was dissolved in 25 parts of benzol and added to the phenol solution. No cooling was employed. After reaction ammonia gas was passed through the solution to neutralize residual hydrochloric acid and the composition was heated at 212° F. for 1½ hours to remove benzol. This mixture was ground in a ball mill with 1½ parts of stearic acid until the product was no longer lumpy.

In molding this material the mold was first greased with stearic acid and the material packed into the mold, then subjected to a pressure of 3800 pounds per square inch at 240° F. for three minutes. Sample was removed cold.

*Example 5.*—Sulphur resin made from meta para cresol using 150% of sulphur chloride was dissolved in denatured alcohol. 100 parts by weight of the resin were used to 200 parts of alcohol. 3 parts of stearic acid was dissolved in the same solution. The solution contained a suspension or small deposit of sulphur and was filtered to remove the latter. Sheets of heavy kraft paper were thoroughly dried in an oven at 220° F., and while the sheets were still warm they were dipped into the alcohol solution and dried (vacuum impregnation may be used to facilitate this operation). A number of the impregnated sheets were laid one on top of the other to form a pack which was molded.

A temperature of 270° F. with a pressure of 3800 pounds per square inch was used in moulding. The time of pressing was three minutes, and the press-sheet was removed warm. The product was very tough, press-sheet or block which could be sawed, drilled or punched and filed and otherwise machined. For example it may be cut into form of switch board panels or into discs, the latter being suitably cut or molded to form "noiseless" gears. The material also may be made into tubes or rods.

Owing to the nature of the sulphur chlorid resin it is not incompatible with rubber and may be molded for example compositely with rubber to give an article having one side rubber and the other side resin or resinous composition.

As previously stated it is possible to add other binding agents in addition to the sulphur resin. For example shellac may be added to the alcoholic solution of the resin and used to make molding powder. Likewise other material such as asphalt, etc., may be introduced. However, it is recommended for a large number of molding purposes that the resin be used as the sole binding agent, better results being obtained where the binder throughout is solely a synthetic resin containing a high percentage of combined sulphur.

Such synthetic resins have solubilities and properties widely different from many natural resins and also from synthetic resins such for example as those made by treating phenol or cresol with formaldehyde. One useful property of the sulphur-resin is its insolubility in gasoline and mineral oils thus allowing molded material to be used for insulating purposes in automobile construction. The high sulphur resins have the property both of dissolving sulphur and also of dissolving in molten free sulphur and if the latter is heated to form plastic sulphur the sulphur-resin will generally maintain the sulphur in a condition of plasticity for a much longer period than sulphur alone will normally remain plastic. Mixtures involving this discovery are claimed in a separate application, Serial Number 609,133 now Patent 1,676,604 and others. The sulphur resins are not readily soluble in carbon tetrachloride. For example a 250% phenol resin and a 150% cresol resin were insoluble in cold or boiling carbon tetrachloride. Molded objects could be boiled in carbon tetrachloride without disintegration. On the other hand these same resins are readily soluble in other solvents, e. g. the cresol resin in alcohol and the phenol resin mentioned, in mixed benzol and alcohol.

*Example 6.*—400 parts by weight of wood flour and 40 parts of lamp black were ground in a ball mill. Carbolic acid crystals were melted and 250% sulphur monochloride was added with stirring, but without the presence of any solvent. The solid resin which formed was in a spongy condition and was readily broken up and ground to a fine powder which was exposed to the air for 24 hours to allow most of the residual hydrochloric acid to escape. When used however, it still contained a small amount of hydrochloric acid. 400 parts of this resin was dissolved in a mixture of benzol 250 parts, and alcohol 110 parts. The solution was filtered to remove free sulphur. 20 parts of hexamethylene tetramine and 12 parts of stearic acid were added. The former did not entirely dissolve. This liquid mixture was used to impregnate the wood flour. After kneading together the mass was dried at 220° F. to remove solvent. The mass was maintained at this temperature for three hours with stirring from time to time. Before drying thoroughly the material stuck to the mold when a sample was tested, but after baking for three hours no adhesion to the mold occurred. A black product having a good surface was made from this material by molding at 300° F. for three minutes under a pressure of 2250 pounds. The composition had very good molding properties as a distributor head having projecting parts and inserts of a character very difficult to mold, was successfully made with this mixture. (Nigrosine, paraphenylene diamine, oil-soluble black, etc. may also be used to afford a dark or black color.)

A resin of a fusible character which does not harden to an infusible condition under the molding treatment but which has a sufficiently high melting point to withstand most service conditions has advantages of economy, etc. For example, if a molded article is made with some projecting part or portion defective through having had an insufficient quantity of the molding powder in the mold or through improper heating conditions or for other reasons, this defective material may be crushed and ground and used over again. Thus it may be ground coarsely and mixed with some of the fresh powder or it may be ground fine and used without any additions of fresh material. In some cases defective molded articles may be repaired by repressing the article with the addition of fresh molding powder to replace the defective part. Hence by the present invention in its preferred form, there is utilized a synthetic or artificial sulphur chlorid resin, prepared from a phenol, which resin is incapable of being converted under the action of formaldehyde, and hot pressing, into an infusible product.

In other cases the molding powder may be tableted to a shape approximately the shape of the mold. This tablet may be made in the cold by simple compression. Such tablets may be stamped out rapidly and then placed in the molding press and brought to the requisite shape and hardness.

With the sulphur chlorid resin it is possible to make up a tablet, put it in the mold, heat the mold on a hot plate and then put the mold into a cold press. In this way the trouble attendant on heating hydraulic presses to the temperature required for molding is avoided.

In other cases the molded material may be preformed by hot compression to the density desired, then given a final press in a mold which produces some definite but minor surface change. As for example, phonograph record blanks may be made by heating and pressing out the blank to be subsequently imprinted by a phonograph die which produces the finished record.

*Example 7.*—500 parts of sulphur chlorid resin are heated on hot mixing rolls, the temperature of the rolls being that caused by 15 pounds of steam. 15 parts by weight of stearic acid are worked into the resin. Finally 600 parts of wood flour are worked in gradually, stripping from the rolls frequently to get a good mixture. Then run the material through cold sheeting rolls to form into sheets of any desired size or thickness. From this sheeted material, sheet molded products may be made. If formaldehyde, paraform or hexamethylene tetramine is to be used it may be put into the resin just before the addition of the wood flour. For example two to four per cent of hexamethylene tetramine may be used.

Similarly wood flour which has been impregnated with a solution of the sulphur chlorid resin may be dried and sheeted in like manner.

The sulphur chlorid resin will however dissolve in ordinary phenol-formaldehyde condensation resins.

*Example 8.*—100 parts by weight of carbolic acid and 25 parts of hexamethylene tetramine were heated to 150° F. until reaction started and the color changed from the reddish white phenol color to a yellow. 30 parts each of benzol and alcohol were immediately added and then 25 parts of 350% phenol sulphur chlorid resin. The solution was heated until the sulphur chlorid resin was completely dissolved. On evaporation and drying at 150° F. a translucent material was obtained which formed an infusible resin, on heating to 250° F.

Thus the effect of formaldehyde on phenol or cresol is quite different from its action on sulphur chlorid resin. While on phenol or cresol the result of heating is an infusible resin, in the case of some of the sulphur chlorid resins of the present invention such for example as the 150% cresol or 250% phenol resin, it is not readily possible to react with formaldehyde or its equivalent to form an infusible resin. Hardening of the sulphur resin itself without the presence of formaldehyde will take place on protracted heating and in the case of some of the high sulphur chlorid cresol resins and especially those made from phenols having a slightly higher boiling point than the cresols, products may be obtained without formaldehyde and solely from the resin itself which are nearly or entirely infusible. Such sulphur chlorid resins made from the higher phenols serve without the use of the expensive reagent formaldehyde to replace in a cheap manner more expensive synthetic or artificial resins.

For example so called tar acids containing a considearable percentage of phenols boiling above the boiling point of ortho, meta or para cresol will react with sulphur chloride used, (say to the extent of 200% or even higher) giving resins with very high melting points approaching a condition of infusibility. (Higher phenols boiling above 215 or 220° C. may be employed.) The color of the resins obtained from crude tar acids is dark and is best adapted for black molded products. On the other hand a highly refined meta para cresol or for that matter a well refined ortho, meta or para cresol will give with sulphur chloride light yellow to light brown resins which may be used for artificially colored molded articles.

The sulphur resin of the present invention has good dielectric strength. A molded disc one-half inch in thickness—made with a wood flour filler was placed between two electrodes in an oil bath and current applied, raising the voltage 5000 volts a minute until the disc was punctured. One puncture occurred at 74,000 and a second at 78,000 volts. As the resin employed was not a washed one but contained traces of hydrochloric acid, these results are of significance.

Phenol is used herein in its specific meaning of carbolic acid and also in its generic sense to embrace phenolic bodies, and derivatives (e. g. chlorphenol) as will be clear from the context.

As the term sulphur chloride is used herein I specifically refer to commercial sulphur monochloride containing sulphur in excess (2% to 8% ordinarily). But the term may also be looked upon in a broader sense as covering the pure monochloride and chlorine-containing sulphur chloride, sulphur dichloride, or other halogen products of sulphur or products containing sulphur monochloride, etc.

While the use of aldehydes is not in all cases, a necessary feature of the invention, yet in those specific features involving aldehyde it is to be understood that I may include not only formaldehyde, paraform and hexamethylene tetramine but acetaldehyde, furfurol, etc.

As a mold lubricant stearic acid has been mentioned but other lubricants such as waxes or oils may be used in some cases.

In certain of the appended claims, I have used the term "formaldehyde material" as embracing formaldehyde itself and its polymers and compounds such as hexamethylenetetramine, herein disclosed, which contain formaldehyde in combined condition and which formaldehyde in such combined condition can act as a setting agent in molding the resin.

What I claim is:—

1. A process which comprises intimately incorporating a material containing a sulphur chloride resin derived from 10 parts of a phenolic body with at least 15 parts of sulphur chloride, with a small quantity of a formaldehyde material, and heating the mixture, whereby the softening point of the material is substantially raised without rendering the resin infusible.

2. A process which comprises intimately incorporating hexamethylene tetramine with a material comprising sulphur chloride resin derived from a phenol, but containing no unresinified phenol.

3. A composition adapted for use in the plastic arts, containing a cresol sulphur chloride resin derived from one part of cresol and not substantially less than one and a half parts of sulphur chloride.

4. A molding composition comprising a phenol sulphur chloride resin containing between 20 and 60% of combined sulphur.

5. A new resinous material comprising a new resin containing at least 40% combined sulphur as a constituent part of the resin, and which resin has the properties of a phenol-sulphur-chloride resin.

6. A molding powder comprising a phenol sulphur chlorid resin, and a small percentage of hexamethylene tetramine reactive therewith, such product on heating being not rendered infusible.

7. A molding powder comprising a phenol sulphur chloride resin containing approximately between 20 and 60% of combined sulphur and an aldehyde.

8. A moldable material comprising a phenol sulphur chloride resin and an aldehyde material, capable of forming by heating under pressure, a molded product containing a fusible resin as a binder, the softening point of the resin material increasing during such heating operation.

9. A moldable material comprising a phenol sulphur chloride resin and hexamethylene tetramine reactive therewith, the said substances being capable of producing by heating, a fusible resin of substantially higher softening point than the initial resin.

10. A molding composition comprising a phenol sulphur chloride resin derived from a phenol and containing combined sulphur sufficient in amount to render the resin insoluble in alcohol.

11. A composition of matter comprising a synthetic resin derived from one part of a phenol and not less than 2.5 parts of sulphur chloride, the same being capable of use in hot molding operations, such resin having the property when heated with material containing formaldehyde or its derivatives, under ordinary molding conditions, of remaining fusible but the softening temperature of the resin being thereby raised.

12. A synthetic resin derived from a phenol and sulphur chloride, suitable for molding, which is incapable of being converted into an insoluble and infusible product by heating with hexamethylene tetramine.

13. A resin soluble in molten free sulphur without substantial chemical reaction between said materials, the solution remaining stable upon cooling to the solid state.

14. A sulphur-containing resin capable of dissolving in molten sulphur and capable of remaining admixed with said sulphur in a stable state, upon cooling to solidification.

15. A molded synthetic resin composition of high dielectric strength, comprising the reaction products of a phenolic body, sulphur chloride and a formaldehyde material, such resin containing not substantially below 20% of combined sulphur.

16. A molded synthetic resin composition of high dielectric strength, comprising the reaction products of a phenolic body, sulphur chloride and a formaldehyde material, such resin containing about 40 to 60% of combined sulphur.

17. A synthetic resin which in the pure state contains not substantially below 20% of sulphur, chemically combined therein as a component part of such resin.

18. A naturally light colored resinous material the same being a chemically combined sulphur phenolic body having more than 6 carbon atoms.

19. A naturally light colored resinous material the same being a chemically combined sulphur phenolic body, said resinous material being substantially insoluble in mineral oils, gasoline, water and carbon tetrachloride.

CARLETON ELLIS.